United States Patent [19]

Scharfenberger

[11] 3,763,561
[45] Oct. 9, 1973

[54] FIBER CUTTER

[75] Inventor: James A. Scharfenberger, Indianapolis, Ind.

[73] Assignee: Ransburg Electro-Coating Corporation, Indianapolis, Ind.

[22] Filed: Feb. 22, 1972

[21] Appl. No.: 228,013

[52] U.S. Cl. .................. 30/128, 30/264, 83/347, 83/348, 83/913
[51] Int. Cl. ......................................... B26b 27/00
[58] Field of Search ................... 83/913, 348, 347, 83/99, 343, 346, 344; 30/128, 130, 263, 264

[56] References Cited
UNITED STATES PATENTS

| | | | |
|---|---|---|---|
| 3,498,166 | 3/1970 | Pook | 83/913 X |
| 3,491,443 | 1/1970 | Fram | 30/128 |
| 2,407,641 | 9/1946 | Anderson | 83/347 X |
| 3,508,461 | 4/1970 | Stream | 83/347 X |
| 2,719,336 | 10/1955 | Stotler | 83/913 X |
| 3,304,821 | 2/1967 | Matino et al. | 83/913 X |

Primary Examiner—Andrew R. Juhasz
Assistant Examiner—James F. Coan
Attorney—Merrill N. Johnson et al.

[57] ABSTRACT

A self-adjusting fiber cutter for cutting lengths of fibers such as glass roving and the like into short lengths. The cutter section of the fiber cutter includes fluidic means for biasing roller means of the cutter section into engagement with another roller means of the cutter section to thereby compensate for wear experienced by the fiber cutter and to facilitate loading and unloading of fibers. The fiber cutter has a low start-up torque to minimize jamming of the fiber cutter at start-up. The pressure roller means of the fiber cutter is eccentrically mounted to compensate for possible inconsistencies in fabrication tolerances between several of the roller means of the fiber cutter.

10 Claims, 4 Drawing Figures

PATENTED OCT 9 1973 3,763,561

FIBER CUTTER

The present invention relates to a self-adjusting fiber cutter for cutting fibers such as glass roving and the like into short lengths and to a fiber cutter having means to facilitate loading and unloading of fibers. More particularly, the invention is directed to a self-adjusting fiber cutter including fluidic means for biasing roller means of the fiber cutter into engagement with another roller means of the fiber cutter to thereby compensate for wear experienced by the fiber cutter and to facilitate loading and unloading of fibers. The fiber cutter has a low start-up torque to minimize jamming at start-up. The pressure roller means of the fiber cutter is eccentrically mounted so that the shaft carrying the pressure roller means can be positioned as to compensate for possible inconsistencies in fabrication tolerances between the several roller means of the fiber cutter.

It is known to mix cut lengths of glass fibers with plural component materials such as thermosetting and thermoplastic plastics, and in particular, polyester resin, to reinforce such plastic materials. Polyester resin reinforced with cut lengths of glass fiber is used in boat hulls, car body panels, bathroom fixtures and the like. Polyester resin reinforced with glass fiber has high chemical and heat resistance, good impact and tensile strength, dimensional stability, stiffness and hardness.

Glass fibers to be cut or chopped into short lengths by a fiber cutter are usually provided as a plurality of continuous lengths of relatively small diameter gathered together. The gathered together glass fibers are called "strands." The diameter of the individual glass fibers is generally in the range of about $10 \times 10^{-5}$ to about $75 \times 10^{-5}$ inch, and usually the diameter of the glass fibers is in the range of about $30 \times 10^{-5}$ to $60 \times 10^{-5}$ inch. Generally, there are about 200 glass fibers per strand. However, a strand may have more or less glass fibers depending on, for example, the diameter of the individual glass fibers. Glass roving includes a number of untwisted strands grouped in a bundle to form a continuous ribbon of multiple strands.

The glass roving supplied from a bundle to a fiber or glass roving cutter is severed by the action of the cutter section thereof into lengths of about one-half to 2 inches, and preferably into lengths of about 1 inch just prior to being mixed with a plural component material such as polyester resin to reinforce the same. Generally, a composite of polyester resin and chopped glass roving includes a nominal glass content of about 15 to 40 weight percent glass, the remainder substantially polyester resin. However, the weight percent of glass roving to plural component material will vary depending on several factors including the type of resin used to provide the matrix of the composite, the process used to make the composite, and the application to which it is desired to put the composite.

A presently available glass roving cutter employed to cut the glass roving into the desired lengths for introduction into a spray of polyester resin includes a cutter roller carrying a plurality of roving cutter blades; the blades are in engagement with a back-up roller having a resilient surface to thereby provide a nip into which the glass roving is fed during operation of the roving cutter. A pressure roller engages the back-up roller and feeds the glass roving to the nip. A roving cutter wherein each of the rollers are fixed relative to one another is illustrated in United States Letters Pat. No. 2,787,314. The blades of the cutter roller press the glass roving against the back-up roller to thereby sever the roving into short lengths called "chop." The glass chop is ejected from the roving cutter into resin. A cutter roller typically operates at speeds of up to about 3,000 revolutions per minute.

During operation of a glass roving cutter wherein each of the rollers are fixed relative to one another, the back-up roller experiences wear due to, the heat generated by friction, thereby reducing the cutter pressure between the cutter roller and the back-up roller. The maintenance of the cutting pressure of the cutter within a given range is necessary if the cutter is to provide glass chop of substantially uniform length having unfrayed extremities. Glass chop having a non-uniform length and/or frayed extremities is not desirab;e for it effects the appearance and strength of the composite in which it is used.

United States Letters Pat. No. 3,491,443 discloses a roving cutter wherein the cutter roller is self-adjusting relative to the back-up roller to compensate for wear to thereby provide a substantially uniform cutting pressure during operation of the cutter. The cutter roller is spring biased against a resilient back-up roller to provide a substantially uniform cutting pressure thereby compensating for wear of the back-up roller. United States Letters Pat. No. 3,034,213 shows the use of a single adjustment screw for adjustably supporting a back-up roller with respect to a cutter roller.

The fiber cutter of the present invention employs fluidic means, such as a plurality of air activated means to bias back-up roller means into engagement with cutter roller means so as to, among other things, compensate for wear experienced by such roller means during the operation of the fiber cutter and to facilitate loading and unloading of fibers. Further, using fluidic means to bias the back-up roller means provides a fiber cutter having relatively low start-up torque to minimize jamming at start-up. Other features and advantages of my fiber cutter, such as less cost, ease of repair and adjustment and the like will be apparent from the following disclosure.

Figure 1:
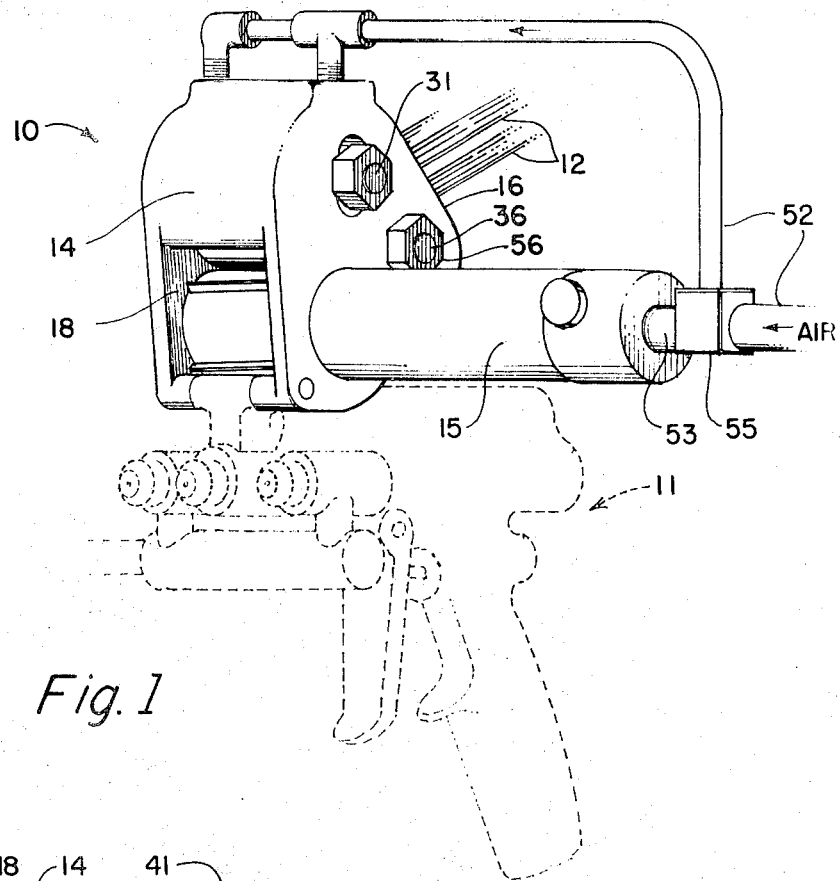
FIG. 1 is a perspective view of a fiber cutter according to the present invention shown mounted on a multi-headed spray gun.

Referring now to the several FIGURES of the drawing, and particularly to FIG. 1, a fiber cutter incorporating the concepts of this disclosure is indicated by the reference numeral 10. The fiber cutter 10 is especially adapted to cut glass roving 12 into short lengths. It is to be understood that the fiber cutter 10 may be used to cut fibers other than glass roving into short lengths.

Figure 3:
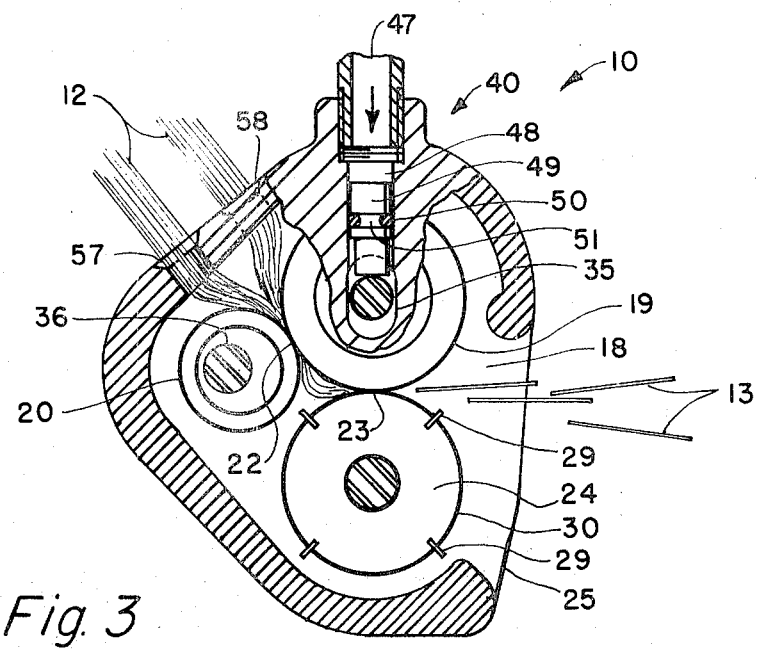
FIG. 3 is a view taken substantially along line 3—3 of FIG. 1 with eccentrically mounted pressure roller means engaged with back-up roller means.

The fiber cutter 10 is shown in cooperative association with spray gun 11. The spray gun 11 is shown in dotted lines. The cutter 10 is suitably carried by the gun 11. As shown in FIG. 3, the cutter 10 chops or cuts glass roving 12 into lengths of cut roving 13, and ejects the cut roving into a spray of plural component material (not shown) such as polyester resin ejected or dispensed from the gun 11. The cut roving 13 and the plural component material are mixed externally of the cutter 10 and the gun 11 and are applied to an application surface (not shown) which serves to form the mixture into an article of manufacture. The details of the structure and function of the spray gun 11 are not disclosed here since such details are discussed in United States Letters Pat. No. 3,399,834.

Figure 2:
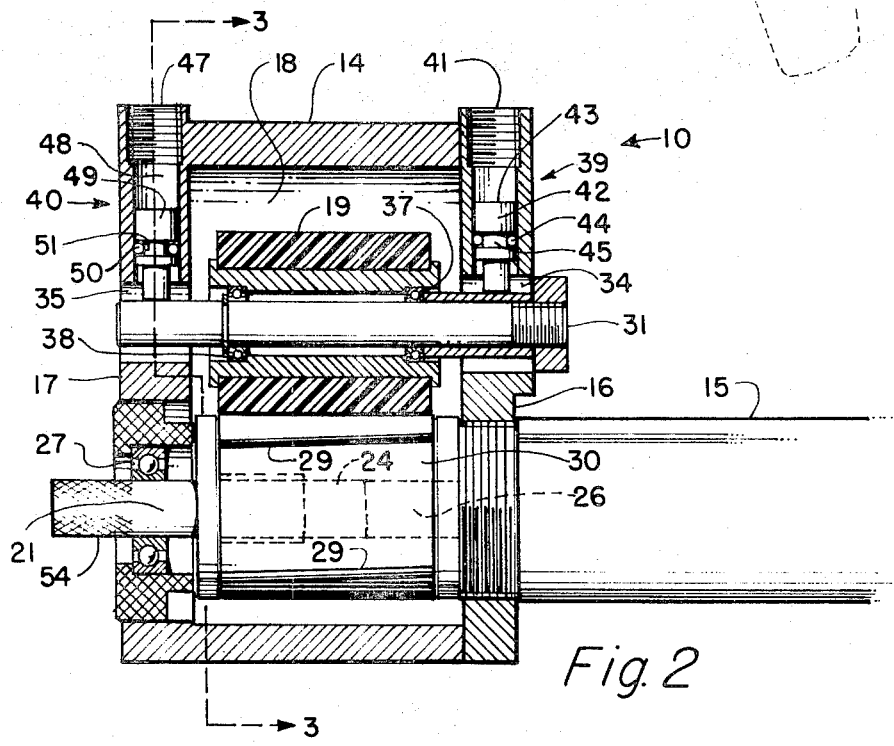
FIG. 2 is a front sectional view of the fiber cutter with parts there removed.

As shown in FIG. 1, the fiber cutter 10 includes a housing means 14 for supporting several of the componennt parts of the fiber cutter. A drive motor 15 is suitably affixed to a side closure 16 of housing means 14. The side closure 16 and the side closure 17 are used to close opposite ends of the housing means 14 as shown in FIG. 2.

A cavity 18 provided by the cooperative relation between the housing means 14 and the side closures 16 and 17 is referred to hereinafter as cutting chamber 18. The housing 14 and the side closures 16 and 17 are fabricated from any suitable structural strong and wear resistant material such as metal and the like.

A back-up roller means 19 and a pressure roller means 20 are suitably carried between the side closure 16 and the side closure 17. Roving from a glass roving bundle (not shown) is introduced into the cutting chamber 18 to the inlet end of a nip 22 provided by the structural cooperation between the back-up roller 19 and the pressure roller 20 as shown in FIG. 3. The roving is discharged from the outlet end of the nip 22 between the back-up roller 19 and the pressure roller 20 and fed to a nip 23 provided by the structural cooperation between the back-up roller 19 and a cutter roller means 24. As the glass roving passes between the back-up roller 19 and the cutter roller 24, it is cut into lengths of cut roving 13 and ejected from an ejection opening 25 of the fiber cutter 10. FIG. 3 shows the fiber cutter 10 cutting glass roving 12 into lengths of cut roving 13.

A shaft 26 of the drive motor 15 is suitably connected to and rotatably drives cutter roller means 24. Cutter roller 24 includes shaft 21 suitably journalled in the side closure 17 by bearing means 27. The shaft 21 is coaxial with the shaft 26 of drive motor 15. The cutter roller 24 is concentrically mounted on and suitably carried by the shaft 21 and the shaft 26 so as to be rotated by the drive motor 15. The cutter roller 24 includes a plurality of cutting blades 29 arranged along its peripheral surface in circumferentially spaced, paralled relationship. The cutting blades 29 each have a razor-like cutting edge projecting a short distance from surface 30 of the cutter roller 24. The cutting edge of each of the blades 29 is substantially straight and suitably carried by the cutter roller in a plane that is at an angle with the plane of the axis of rotation of the cutter roller 24. The circumferential distance between the individual cutting blades 29 dictates the length of the cut roving 13 ejected from the fiber cutter 10. The cutter roller 24 is fabricated from any structurally strong and rigid material such as rigid plastic, metal and the like.

The back-up roller 19 is concentrically mounted on a stationary shaft 31 and rotatable thereon through bearing means 37 and bearing means 38. Opposite ends of the stationary shaft 31 are suitably retained in slots 34 and 35 in the side closures 16 and 17 respectively.

Figure 4:
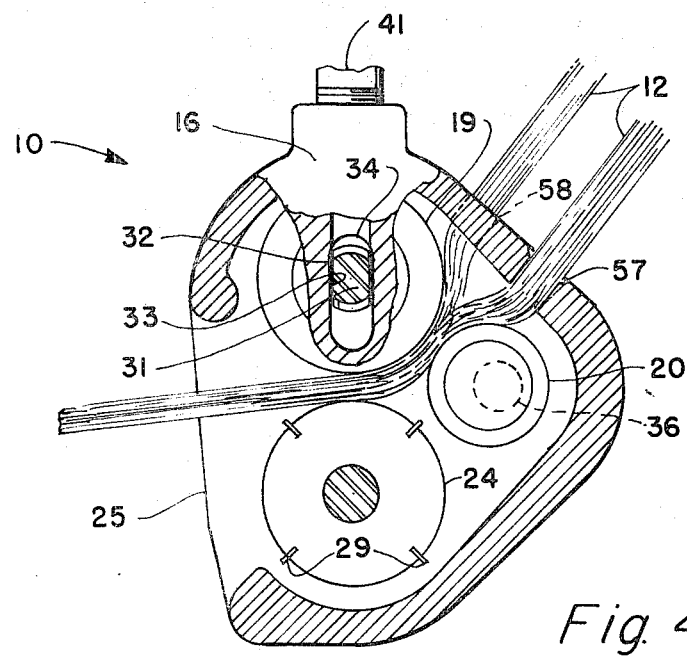
FIG. 4 is a side view of the fiber cutter with selected portions thereof removed illustrating the preferred position of the roller means of the fiber cutter during the loading and unloading of the fibers.

One end of the stationary shaft 31 includes a flat section 32, shown in FIG. 4, that engages with flat section 33 of elongated slot 34 in the side closure 16 to prevent rotation of the shaft 31. As shown in FIG. 2, the oppoiste end of the stationary shaft 31 is positioned in elongated slot 35 in the side closure 17. It should be seen that the shaft 31 can move in a plane substantially perpendicular to the axis of rotation of the back-up roller 19 yet is prevented from undergoing rotational displacement. The degree of movement of the shaft 31 in the plane perpendicular to the axis of rotation of the back-up roller 19 is generally dependent on the length of the elongated slots 34 and 35. Preferably, the length of each of the elongated slots 34 and 35 is substantially the same.

The back-up roller 19 is made of any suitable resilient material such as rubber, polyurethane, or the like. It should be appreciated that while the cutter roller 24 is rotatably driven by the drive motor 15, rotation of the cutter roller 24 transmits a driving force to the back-up roller 19 by virtue of its frictional engagement with the cutter roller 24 and to the pressure roller 20 by virtue of frictional engagement of the pressure roller with the back-up roller. Although the surface of the back-up roller 19 is illustrated in the drawing as being smooth, it will become roughened during operation by engagement with the cutter blade 29 of the cutter roller 24.

As shown in FIG. 2, fluidic means 39 and 40 are are used to suitably bias the back-up roller 19 into engagement with the cutter roller 24. Each of the fluidic means 39 and 40 is shown as a pneumatic or air cylinder, although hydraulic cylinders may also be used. The fluidic means 39 is located in the closure means 16 and includes an air inlet port 41, a cylinder 42, a displaceable piston 43 and a resilient O-ring air seal 44 seated in and retained by annular groove 45 formed in piston 43. The fluidic means 40 is located in the closure means 17 and includes an air inlet port 47, a cylinder 48, a displaceable piston 49, and a resilient O-ring air seal 50 seated and retained in annular groove 51 of piston 49. The cylinders and pistons of each of the fluidic means 39 and 40 are fabricated from any suitable structurally strong and wear resistant material such as metal and the like. The piston 43 of fluidic means 39 is biased against the stationary shaft 31 by an elevated air pressure in the fluidic means 39 acting on the piston 43 to bias the piston into engagement with one extremity of the shaft 31. The piston 49 of the fluidic means 40 is biased against the shaft 31 by an elevated air pressure in the fluidic means 40 acting on the piston 49 to bias the piston into engagement with the opposite extremity of the stationary shaft 31. It is seen that the shaft 31 biases the back-up roller 19 into engagement with the cutter roller 24 in proportion to the air pressure acting upon the pistons 43 and 49. The greater the air pressure acting upon the pistons 43 and 49, greater the force present at the nip 23 between the back-up roller 19 and the cutter roller 24. The air pressure supplied to the fluidic means 39 and 40 is such that the roving to be cut is firmly gripped between the engaging portions of the back-up roller 19 and the cutter roller 24 so as to cut the roving into the desired uniform length without having frayed extremities.

The amount of elevated air pressure in the fluidic means 39 and 40 can be regulated by a suitable air pressure regulation means (not shown) connected to the inlet air ports of each of the fluidic means. Generally, an air pressure from about 10 to about 100 psi, and preferably from about 25 to about 40 psi acting on the pistons 43 and 49 is adequate to achieve desired cutting of the glass roving fibers 12. As shown in FIG. 1, air is supplied to the fluidic means 39 and 40 through conduit 52 from a suitable compressed air source (not shown).

Referring to FIG. 4, loading and unloading of the glass roving fibers 12 of the fiber cutter 10 is accomplished by releasing the elevated air pressure from fluidic means 39 and 40. The shaft 31 and its back-up roller 19 are no longer biased permitting a user to remove the glass roving fibers 12 from the cutter 10 by moving the back-up roller 19 away from the cutter roller 24 with little effort and pulling the roving fibers out of the cutter. New or different fibers 12 can be loaded into the cutter 10 without using additional means to assist in inserting such fibers between the pressure roller 20 and the back-up roller 19 and between the back-up roller 19 and the cutter roller 24. To load the cutter 10, a user threads the fibers 12 through the apertures 57 and 58 and then between the pressure roller 20 and the back-up roller 19 to an area adjacent the cutter roller 24. The user then manually rotates the cutter roller 24 by rotating knurled end 54 of shaft 21. The manually rotated blades 29 of the cutter roller 24 tend to guide the roving fibers 12 into the space between the spaced apart back-up roller 19 and the cutter roller 24 toward the ejection opening 25 thereby loading the cutter 10. Applying air to the drive motor 15 and to the fluidic means 39 and 40 renders the cutter 10 operational.

Using spring means to bias the back-up roller requires that the back-up roller be moved with sufficient force to overcome the biasing action of the spring whereas removing the elevated air pressure from the fiber cutter 10 requires that the user only overcome the gravitational force exerted on the back-up roller 19 to load or unload the fiber cutter.

The start-up torque of the fiber cutter 10 is less than that required by a spring biased fiber cutter, since the back-up roller 19 of cutter 10 is not fully biased at the time rotation of the cutter roller 24 is initiated whereas in a spring biased cutter, the biased roller is fully biased at the time rotation of the rollers of the cutter is initiated.

Preferably, the drive motor 15 is a pneumatic or air motor, although it should be appreciated that the drive motor may be any other suitable type. An air operated drive motor is preferred inasmuch as compressed air is also employed to bias the back-up roller 19 into engagement with the cutter roller 24 so as to compensate for wear experienced by the fiber cutter 10 during its operation. The structure of the fiber cutter 10 is described with the cutter roller 24 being motor-driven, however, it should be understood that the back-up roller 19 may be driven by the drive motor 15 instead of the cutter roller 24.

Referring again to FIG. 1, the air motor 15 includes an inlet 53 connected to the conduit 52 through T-section 55. The air motor 15 is of standard construction, and therefore, in the interest of clarity, the details of the air motor have been omitted from the drawing and this specification. The drive shaft 26 of the air motor 15 is directly connected to the cutter roller 24 to rotatably drive the cutter roller in such a direction as to ensure that cut roving 13 is directed toward and out the ejection opening 25 of the fiber cutter 10.

Although not shown, the exhaust of the air motor 15 can be utilized, if desired, to assist in guiding the glass roving 12 from the outlet end of the nip 22 defined by the back-up roller 19 and the pressure roller 20 and to the inlet end of the nip 23 defined by the back-up roller 19 and cutter roller 24. The exhaust air of the air motor 15 can also be used to assist in ejecting the cut roving 13 from the ejection opening 25.

Referring again to FIG. 3, means is provided for biasing the rotatable pressure roller 20 into engagement with the back-up roller 19. The pressure roller 20 is eccentrically mounted on the stationary shaft 36. The pressure roller 19 is fabricated from any suitable wear resistant material such a metal. The shaft 36 has its opposite extremities (not shown) fixedly mounted in the side closures 16 and 17. During operation of the fiber cutter 10, the shaft 36 is retained in fixed position by a suitable locking means 56 shown in FIG. 1 as a bolt turned onto threads (not shown) formed in one extremity of the shaft 36. Turning the bolt 56 so as to allow manual rotation of the shaft 36 by the user permits the user to displace the pressure roller 20 so as to compensate for possible inconsistancies in fabrication tolerance of the rollers. Returning the bolt 56 to its initial position on the threads of shaft 36 locks the pressure roller 20 in position with respect to the back-up roller 19.

It will be understood that modifications and variations may be effected without departing from the scope of the novel concepts of the present invention.

I claim:

1. A self-adjusting fiber cutter for use with a device for dispensing material, the fiber cutter comprising rotatable roller means including a rotatable back-up roller and rotatable cutter roller, a fluid motor to drive the rotatable roller means, means for cutting fiber in the nip into short lengths carried by the rotatable cutter roller, means for fluidically biasing one of the rotatable roller means into cooperative relationship with the other rotatable roller means to provide a nip and to adjust the cutting pressure of the nip exerted on the fiber during the operation of the fiber cutter, and means interconnecting a source of fluid under pressure with both the fluid motor and the means for fluidically biasing one of the rotatable roller means.

2. The self-adjusting fiber cutter of claim 1, including pressure roller means free to rotate concentrically about an eccentrically mounted stationary shaft.

3. The self-adjusting fiber cutter of claim 1, wherein the means for fluidically biasing one of the roller means includes air cylinder means comprising movable piston means biasing the one of the roller means into engagement with the other roller means.

4. The self-adjusting fiber cutter of claim 3, wherein the movable piston means of the air cylinder means bias a shaft carrying the roller means toward the other roller means, the other roller means being fixedly positioned.

5. The self-adjusting fiber cutter of claim 4, wherein the cutter roller is rotatably driven by the fluid motor, and the back-up roller is biased into engagement with the cutter roller by the movable piston means of the air cylinder means.

6. The self-adjusting fiber cutter of claim 5, wherein the shaft of the back-up rolelr means is substantially stationary and retained in elongated slots to be movable in a plane substantially perpendicular to the axis of rotation of the cutter roller means.

7. The self-adjusting fiber cutter of claim 6, wherein the stationary shaft includes a flat portion that engages with one of the elongated slots to retain the shaft in a stationary location.

8. A fiber cutter for ejecting cut lengths of fibers into a spray of plural component material comprising a back-up roller and a cutter roller in cooperative relationship to provide a nip for the fiber to be cut, the cutter roller including means for cutting the fiber in the nip into short lengths, means to drive the back-up roller and cutter roller, means for fluidically biasing one of the rollers into engagement with the other roller to adjust the cutting pressure of the nip exerted on the fiber during operation of the cutter, said driving means and said fluidically biasing means being simultaneously operable, and a pressure roller free to rotate concentrically about an eccentrically mounted stationary shaft in cooperative relationship with the back-up roller to provide a nip for the fiber to be cut.

9. The cutter of claim 8, wherein the stationary shaft is adapted to be arcuately displaced to displace the pressure roller from cooperative relationship with the back-up roller.

10. The cutter of claim 9, wherein the stationary shaft includes means for fixedly retaining the stationary shaft in position during cutting of the fiber.

* * * * *